United States Patent
Zoldi et al.

(10) Patent No.: US 11,003,947 B2
(45) Date of Patent: May 11, 2021

(54) DENSITY BASED CONFIDENCE MEASURES OF NEURAL NETWORKS FOR RELIABLE PREDICTIONS

(71) Applicant: Fair Isaac Corporation, Minneapolis, MN (US)

(72) Inventors: Scott Zoldi, San Diego, CA (US); Shafi Rahman, San Diego, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 0 days.

(21) Appl. No.: 16/285,173

(22) Filed: Feb. 25, 2019

(65) Prior Publication Data

US 2020/0272853 A1 Aug. 27, 2020

(51) Int. Cl.
| | |
|---|---|
| *G06N 3/08* | (2006.01) |
| *G06K 9/62* | (2006.01) |
| *G06N 20/00* | (2019.01) |
| *G06F 17/18* | (2006.01) |

(52) U.S. Cl.
CPC ............ *G06K 9/6226* (2013.01); *G06F 17/18* (2013.01); *G06K 9/6227* (2013.01); *G06K 9/6256* (2013.01); *G06K 9/6277* (2013.01); *G06N 3/08* (2013.01); *G06N 20/00* (2019.01)

(58) Field of Classification Search
CPC ...................................................... G06N 3/08
See application file for complete search history.

(56) References Cited

U.S. PATENT DOCUMENTS

| 10,108,791 | B1 | 10/2018 | Masterman | |
|---|---|---|---|---|
| 2017/0294010 | A1* | 10/2017 | Shen | G06K 9/6256 |
| 2017/0337682 | A1* | 11/2017 | Liao | G06T 7/30 |
| 2018/0060744 | A1* | 3/2018 | Achin | G06Q 10/04 |
| 2018/0060759 | A1* | 3/2018 | Chu | G06N 20/00 |
| 2018/0247107 | A1* | 8/2018 | Murthy | G06T 7/0012 |
| 2019/0005358 | A1* | 1/2019 | Pisoni | G06K 9/6256 |
| 2019/0188567 | A1* | 6/2019 | Yao | G06N 3/082 |
| 2019/0313963 | A1* | 10/2019 | Hillen | G06N 3/0454 |
| 2019/0354613 | A1 | 11/2019 | Zoldi et al. | |
| 2020/0034634 | A1* | 1/2020 | Warshauer-Baker | B60W 10/08 |
| 2020/0074205 | A1* | 3/2020 | Yi | G06F 16/783 |

(Continued)

FOREIGN PATENT DOCUMENTS

WO WO-2004/090807 A2 10/2004

OTHER PUBLICATIONS

Lakshminarayanan, B. et al. (2017), "Simple and Scalable Predictive Uncertainty Estimation using Deep Ensembles," arXiv.org, 12 pages.

(Continued)

*Primary Examiner* — Cindy Trandai
(74) *Attorney, Agent, or Firm* — Mintz Levin Cohn Ferris Glovsky and Popeo, P.C.

(57) ABSTRACT

A system and method for learning and associating reliability and confidence corresponding to a model's predictions by examining the support associated with datapoints in the variable phase space in terms of data coverage, and their impact on the weights distribution. The approach disclosed herein examines the impact of minor perturbations on a small fraction of the training exemplars in the variable phase space on the weights to understand whether the weights remain unperturbed or change significantly.

20 Claims, 8 Drawing Sheets

(56) References Cited

U.S. PATENT DOCUMENTS

2020/0126126 A1* 4/2020 Briancon ............. G06K 9/6297
2020/0134382 A1* 4/2020 Zhuravlev ............ G06K 9/6256
2020/0151591 A1* 5/2020 Li ........................... G06F 16/35
2020/0151613 A1* 5/2020 Yoo ......................... G06F 17/18

OTHER PUBLICATIONS

Mobasser, F. et al. (2006), "A Method for Online Estimation of Human Arm Dynamics," Conference Proceedings. Annual International Conference of the IEEE Engineering in Medicine and Biology Society, 1:2412-2416.

* cited by examiner

DENSITY BASED CONFIDENCE MEASURES OF NEURAL NETWORKS FOR RELIABLE PREDICTIONS

TECHNICAL FIELD

The subject matter described herein relates to neural networks, and more particularly to density-based confidence measures of neural networks for reliable predictions.

BACKGROUND

Traditional neural networks, including deep neural networks, generate a point estimate of the model weights, w. Thus, the uncertainty in the data, D, is not reflected in the model weights, w. As such predictions from such networks can often come across as too confident. An ability to provide a confidence estimate to the predictions would allow practitioners to better trust the model, which would open up many new applications where knowing how certain one is of the prediction is often equally important. Where the confidence in the score is low, it would provide practitioners additional information to guide their decisioning. This leads to additional benefits that are discussed later in the white paper. Furthermore, being able to provide confidence would allow learning even from limited, noisy and missing data with appropriate confidence intervals specified. This would allow for building predictive models with data which was earlier not possible, or allow focus on better stratified sampling at the data and variable coverage level to ensure model applicability in the space of input data is maximal.

Bayesian approach to weights learning attempts to estimate a posterior distribution of the weights given the data, p(w|D), as opposed to a point estimate as in traditional modeling techniques. To do this, Bayes theorem can be used:

$$p(w|\mathcal{D}) = \frac{p(\mathcal{D}|w)p(w)}{p(\mathcal{D})} \quad (1)$$

Accordingly, a prior belief about the weights, p(w), are changed to the posterior p(w|D) as a consequence of seeing the data. Unlike in traditional approaches, where a point estimate of w is performed, here a density distribution p(w|D) is used. P(D|w) is the likelihood function. In traditional approaches of point estimation of the weights parameters, w, it is done by maximizing this likelihood function. This is equivalent to finding the minimum of the negative log probability, or the error function. Under Gaussian priors, this error function boils down to:

$$E(w) = c_1 \Sigma_{n=1}^N \{y(x^n;w) - t^n\}^2 + c^2 ||w||^n \quad (2)$$

Where N is number of data points, and x and t are the predictors and targets respectively, and y is the model output. Note that the first term is the usual sum-of-squares error and the second term is the L2 regularization. Assuming a mechanism to determine the posterior, p(w|D), the prediction of the network is arrived at by marginalizing the weights as follows:

$$\bar{y} = \int y(x;w) p(w|D) dw \quad (3)$$

This integration over spaces of hundreds or even thousands of weight parameters is an expensive operation. Operating on the density of y, on the other hand, can reduce some of the computational complexity. Furthermore, this integration does not have analytic solution in most cases, except in some tractable situations like the Gaussian assumption described earlier. Even most numerical integration techniques would also fail. For example, by sampling a weight space on some regular grid, the number of grid points grow exponentially with number of weight parameters, making the corresponding numerical computation intractable.

Figure 1:
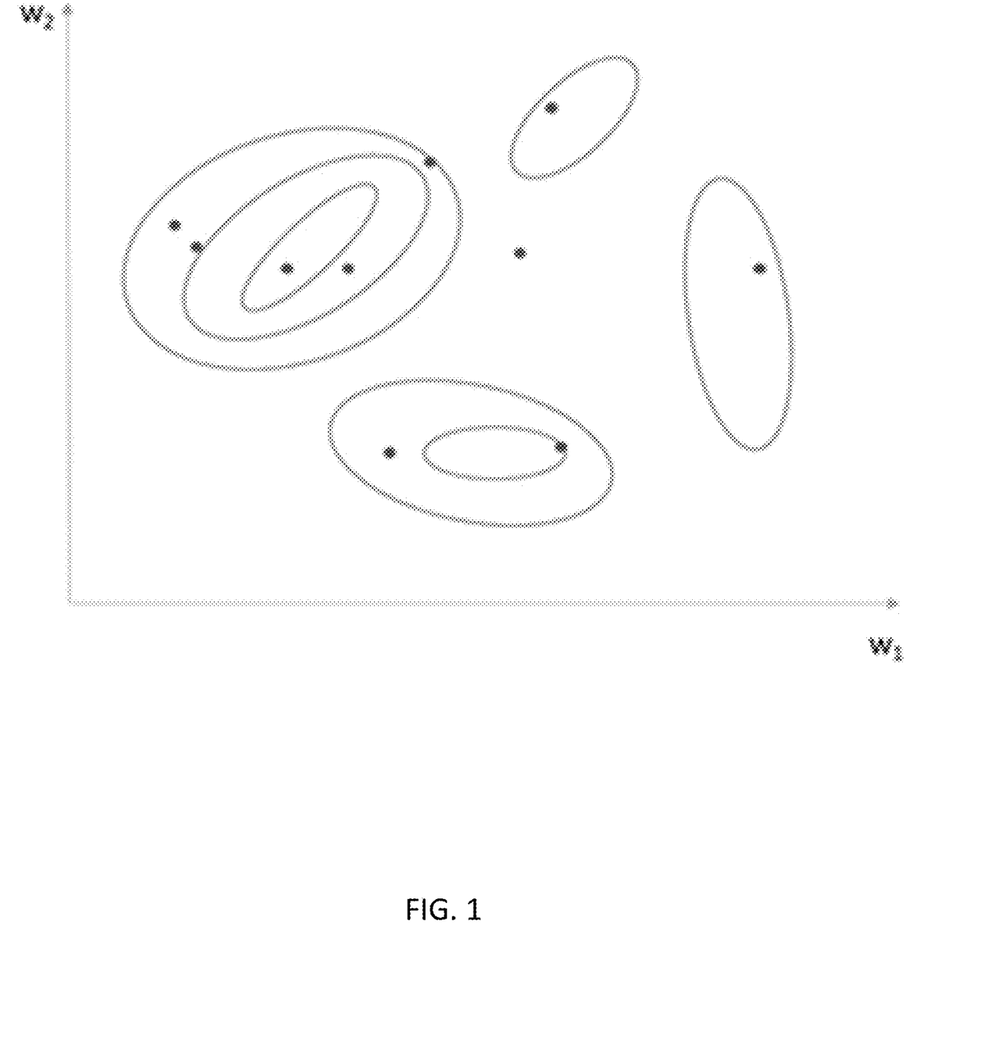
FIG. 1 illustrates a density distribution of the weight vector as contour maps on a two dimensional weights phase-space.

In most of the attempts to understand model confidence, the effort boils down to sampling from the density distribution of the weights space. FIG. 1 shows a density distribution of the weights as contour maps on a two-dimensional weights space. The dots represent the samples of the weight vectors taken from this posterior. If sampling can be done from the posterior p(w|D), then the integral can be approximated using a finite sum:

$$\bar{y} = \frac{1}{L} \sum_{i=1}^{L} y(w_i) \quad (4)$$

where $\{w_i\}$ is sample of weight vectors generated from the posterior p(w|D). Thus, more likely $w_i$ is more often sampled than less likely $w_i$. However, the present system and method is configured to attempt to understand the coverage provided by the available data in the various regions of the phase space of the weights.

Multiple ways to sample from the posterior have been attempted, including a random walk approach and Metropolis algorithm, which are computationally prohibitive, as well as lead to correlated samples. A Hybrid Monte Carlo algorithm uses back-propagation to obtain the gradient of p(w|D) to use for selecting the search direction such that regions of higher posterior probability is favored for sampling. Further improvements came along when Welling and Teh (2011) took this idea further, and used stochastic gradient Langevin dynamics to inject a Gaussian noise into the parameter updates during feedforward-back-propagation.

$$\Delta \theta_t = \frac{\epsilon}{2} \left( \nabla \log p(\theta_t) + \sum_{i=1}^{N} \nabla \log p(x_i | \theta_t) \right) + \eta_t \quad (5)$$

$$\eta_t \sim N(0, \epsilon)$$

This leads to the trajectory of the parameters traversing the full posterior distribution instead of converging to a point estimate. If samples are taken along the way, it leads to unbiased sample of the true posterior over weight vectors.

Yet, in spite of these advances and demonstrations on toy datasets, a lack of viable production quality density-based neural networks is seen. This is not only due to high cost of building these models, but more importantly these methods are unable to assign confidence to the scores based on the coverage seen within the training dataset for the score in a particular phase space of the data. Equally significantly, from versatility perspective, these methods do not easily translate to an arbitrary model architecture.

In predictive modeling, models are almost never built directly on the raw data. Raw data elements are usually not suitable for building predictive models. Instead, the raw data is first transformed into more usable, meaningful and predictive variables or predictors. This transformation often involves business and domain insights and with the nature of transformations dependent on the problem being solved. The model is then developed using this transformed data in the variable phase space. Often the variable phase space is simplified using a variable reduction technique before building the model, guided by the classes that the model is intended to learn to separate.

SUMMARY

This document describes a system and method for learning and associating reliability and confidence corresponding to a model's predictions by examining the support associated with datapoints in the variable phase space in terms of data coverage, and their impact on the weights distribution. The approach disclosed herein examines the impact of minor perturbations on a small fraction of the training exemplars in the variable phase space on the weights to understand whether the weights remain unperturbed or change significantly.

In certain aspects, a method, system and computer program product include steps of selecting an original neural network model from a set of neural network models for an original dataset, the original neural network model having a set of predictor variables, the dataset comprising a plurality of datapoints that are mapped into a high-dimensional grid that defines a plurality of neighborhood data regions, each of the neighborhood data regions having a density of datapoints. The steps further include applying the original neural network model on the original dataset to generate a model score for each datapoint in the dataset, the model score representing a fit of input predictor variables to target variable for the set of variables of the original neural network model. The steps further include iteratively perturbing the given dataset by sampling neighborhood data regions to duplicate, eliminate or retain each datapoint therein according to a density-based perturbation logic to generate a plurality of perturbed training datasets. The steps further include generating a perturbed neural network model based on each generated perturbed training dataset, to train a plurality of perturbed neural network models, and applying each perturbed neural network on the original dataset to generate a model score for each datapoint in the given dataset, to generate a plurality of model scores for each data point in the original dataset. The steps further include computing a statistical variation of the scores of each datapoint in the original dataset generated by the plurality of perturbed neural networks to train a confidence model with the statistical variation as the target, and creating a no-confidence measure database that records the neighborhood data regions with a data population density below a coverage threshold on the original training data within each neighborhood data region. The steps further include generating, using the confidence model, a confidence score for each datapoint in a second dataset, the confidence score defining a confidence of the original neural network model score for each datapoint in the second dataset, and flagging a datapoint in a second dataset as having no confidence if the corresponding grid cell is present in the no-confidence measure database.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

This document focuses on examining, learning and generating confidence associated with a model's predictions based on the support associated with datapoints in the variable phase space in terms of data coverage, and its impact on the weights distribution. The approach described herein examines the impact of minor perturbation on a small fraction of the training exemplars in the variable phase space on the weights to understand whether the weights remain unperturbed or change significantly.

In accordance with implementations described herein, the notation, D, is used to represent the transformed data in the variable phase space. In the subsequent sections, the term dataset is purported to refer to transformed dataset and not the raw dataset, unless explicitly mentioned otherwise. In the rare case, where model is built directly on the raw dataset, the raw data phase space acts as the variable phase space.

This document describes systems and methods that examines and learns the importance of datapoints and regions of data in the variable phase space, to the weights in probabilistic sense, irrespective of the training methods. To do so, uncertainty is measured based on input data densities. Confidence in the model score is based on the data that has been seen in the phase space during model training. If very little data is seen in a particular region in the phase space, then there will be low confidence in the score for a datapoint in that region. Similarly, in the regions with many data points, there should be significantly higher confidence in the scores.

From data density perspective, a region in the phase space with very little data would be sensitive to perturbations. Thus, a density based neural network model in such a scenario should produce wide range of scores for datapoints in such regions, indicative of low confidence in the scores. This is achieved by analyzing perturbations in the neighborhood of a datapoint at the time of training the model and assessing its impact on the weights of the model. This perturbation is achieved by duplicating or removing some of the datapoints in the neighborhood, including the data point in consideration. This perturbation allows to learn the uncertainty in the neighborhood and reflect it in the weights of the model.

To determine the neighborhood of a datapoint, the variable phase space is digitized using a grid technique. Each variable is discretized into value ranges, or value bins, based on either an entropy maximization technique or into equi-sized bins. This discretization yields a hyper-grid, with each grid cell representing a neighborhood region in the phase space. As part of the model development, variable phase space is simplified by using one of the many standard variable reduction techniques, guided by the classes that the model is intended to learn to separate. This allows for having a manageable number of grid cells and counter the impact of the curse of dimensionality. This approach has been described extensively in U.S. patent application Ser. No. 15/981,755, entitled "Method and Apparatus for Analyzing Coverage, Bias, and Model Explanations in Large Dimensional Modeling Data", the contents of which are incorporated by reference for all purposes.

Figure 2:
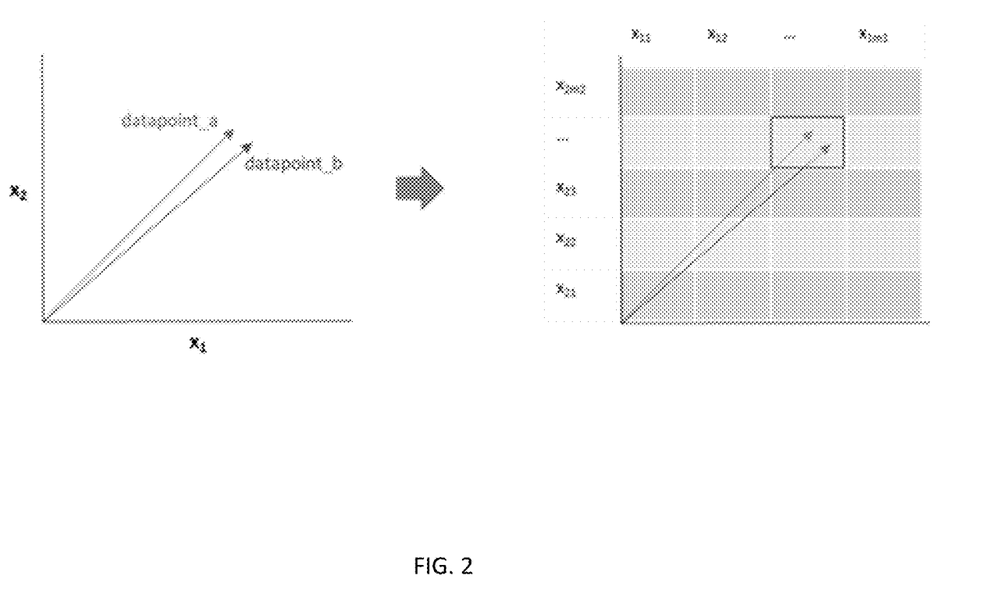
FIG. 2 shows two datapoints, datapoint_m and datapoint_n, in the variable phase space and their assignment to the grid cells.

FIG. 2, for instance, shows two datapoints, datapoint_m and datapoint_n, in the variable phase space, which have slightly different variable values, but due to the process of variable discretization, end up in the same grid cell. Both the datapoints can be referenced using a unique index pertaining to that grid cell, called a grid index of that cell. These two datapoints are considered to be neighbors of each other. Note that the terms $x_{11}$, $x_{12}$, and similar terms annotating the grid cells, on both the axes, represent the value bins, and can be used to index the grid. Often, these indices are simplified as ordinal values of 1, 2, 3, etc.

This grid digitizes the variable phase space, to understand the coverage in each grid cell in terms of the proportions of the class tags with respect to the overall distribution. The coverage in a grid cell is the number of data points in that cell. Higher the coverage, more the confidence and vice versa. Grid cells with higher coverage are less susceptible to perturbations, while those with lower coverage are impacted significantly by perturbations. In case of classification problems, where the model learns to separate two or more classes, the perturbation is a function of the coverage for each class in the grid cell instead of the overall coverage in that grid cell. For instance, if it is a binary classification problem into good and bad cases, then the perturbation would be a function of how many good cases and bad cases exist in the given grid cell. Furthermore, one may even consider the total counts of good and bad cases in the training dataset, D, to determine the quantum of perturbation.

The power of this sampling approach is that it allows learning of model weights corresponding to the perturbed sample data. The generation of neural network models pertaining to the perturbed samples is a key requirement for learning a density-based neural network model. A practical benefit of this approach is that this methodology can be carried out using any readily available model architecture even using an off the shelf training algorithm in any commercial or proprietary machine learning toolkit without need for any modification of the training algorithm.

For instance, to train a density-based neural network model, the process begins by finding the most optimal best fit model as the predictor model for point estimation, as described in the next section. Then, the architecture of this best fit model is used, and corresponding hyper-parameters with a the feed-forward back-propagation training algorithm to fit a multitude of models, $y_i$, on perturbed instances of the dataset, $D_i$. The weight vector of the model, $w_i$, learns the nuances of the variation in the data in the perturbed regions along with the general tendencies. At the end of the process, a sample of neural network models, $y_i$, corresponding to the perturbed sampled datasets $D_i$, with weight vectors $w_i$ is left.

$$y_i = y(w_i), \text{ where } w_i \text{ is dependent on } D_i \qquad (6)$$

When looked at side by side, the models, $y_i$ agree on the regions with strong coverage, but disagree in the regions with poor coverage. This variational aspect of scores is then taught to another model, called a confidence model. Often, though not necessarily, the confidence model can have a simpler architecture than a neural network, say, a linear regression or a decision tree model.

Training the Best Fit Predictor Model

In an initial step, the neural network model that is the best fit model on the given dataset, D is identified. This model, $y_0$, can be a traditional neural network model that carries out a point-estimate. Often a pre-processing step can be applied to select a subset of variables of the transformed dataset, D, as model predictors, guided by the classes that the model is intended to learn to separate. This allows to simplify the variable phase space and as a consequence the structure of the model. Furthermore, this also keeps the number of consequent grid cells manageable, and avoid the curse of dimensionality. Usually the way to train a model is to split the dataset in test and train, and then fit the model on the train set only. To train the model, the target or class variable, t, is used to guide the training of the model.

A hyper-parameter search is often employed to find the most optimal best fit model. These hyper-parameters are used as reference for the development of the density based models. The determination of the predictor model is guided by using the test dataset to ensure that the model is not over-fitted. Among the parameters that are learnt, is the number of epochs required to train the best fit model, the number of hidden layers and hidden nodes which influences the structure of the model and the choice of the predictor variables. All the neural network models that get generated during the sampling process would have the same architecture as the best fit model, including the predictor variables as inputs to the model and number of hidden layers and hidden nodes. Note that these apply even if the predictor model is not the most optimal best fit model.

Perturbation Based Sampling

As discussed in the previous section, to probe the variable phase space for coverage, grid discretization is applied. Before applying the grid discretization, the variable phase space is simplified by reducing the variables to the subset of variables that are input predictors to the predictor model. Then in multiple iterations, i, a small proportion of grid cells with at least M datapoints is sampled, which is the minimum support required for the data coverage. Any grid cell with less than M datapoints is considered to have no viable coverage. M is user defined. This is done as opposed to sampling the data points directly, so as to ensure a good representation of both high coverage regions as well as low coverage regions when the dataset is perturbed. Furthermore, care is taken such that the proportions of different classes of the target variable are taken into consideration while doing so. The approach defined here works for both binary class problems as well as multi-class problems. Then, the points in each sampled cell, j, are identified. A cell j that has coverage, $N_j$, will have, $$N_j = \sum_k N_{kj}$$

where, $N_{kj}$ is the coverage for class k of the target variable in the grid cell j As an example of the perturbation based sampling, one of the following is done for each grid cell, j, where $N_j \geq M$:

With probability $1/(N_{kj}+\alpha)$, a data point of class k, in grid cell j, is selected, and duplicated.

With probability $1/(N_{kj}+\alpha)$, a data point, of class k, in grid cell j, is selected and eliminated.

With probability $(N_{kj}\alpha-2)/(N_{kj}+\alpha)$, a data point, of class k, in grid cell j, selected and retained.

Figure 3:
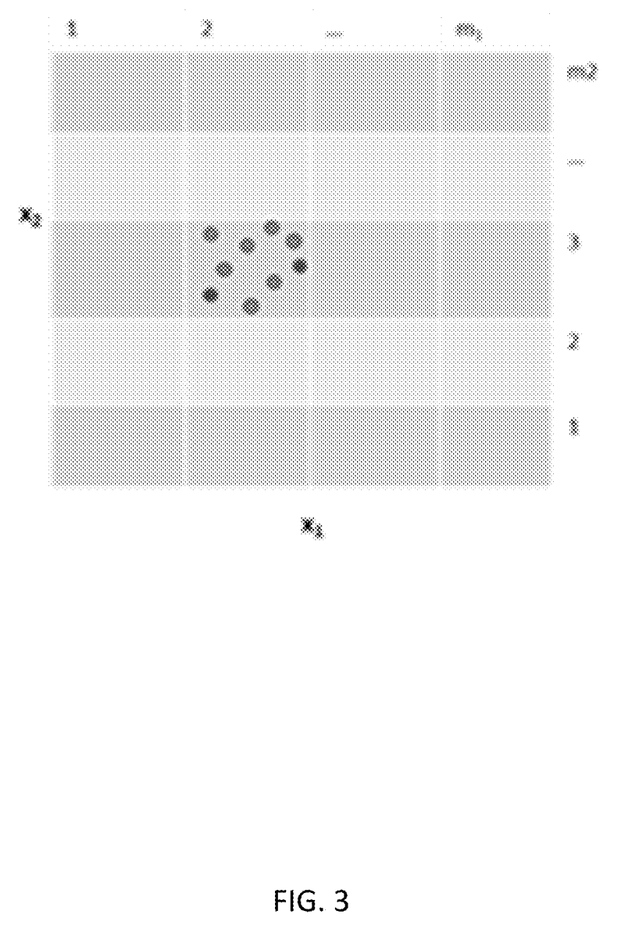
FIG. 3 illustrates a discretized 2-dimensional variable phase space.

When a data point is duplicated, a small Gaussian noise can be added to the data point without changing its class tag. As can be seen in FIG. 3, cells with low coverage are more susceptible to be perturbed than the cells with higher counts. Similarly, in a grid cell, class with lower counts is more susceptible to be perturbed than the class with higher coverage. The parameter $\alpha$ is $>=1$ and allows control of the proportion of change in grid cells. Often this term is set to either 1, or little over 1, otherwise the regions of low coverage are often unaltered. The resulting dataset, $D_i$, is used for training a model as described below.

FIG. 3. In this discretized 2-dimensional variable phase space, the grid cell with grid index of (2,3) has 2 datapoints of dark-shaded class and 7 datapoints of light-shaded class. Different graphical representations, such as colors, can also be used. Using the sampling scheme described above and $\alpha=1$, each red point is eliminated with a probability of ⅓ and each blue point is eliminated with a probability of ⅛.

In a variant of this sampling scheme, the sampling proportions are not only function of how many cases of each class exist in a given grid cell, it is also dependent on the total counts of each class in the overall training dataset, D.

Density-Based Model Training

As discussed earlier, the best fit predictor model, $y_0$, is first trained on the unperturbed dataset D. Then, by iterating through the perturbation based sampling, a new model, $y_1$, is trained using the perturbed dataset $D_1$. In the next step of the iteration, another model, $y_2$, is trained using the perturbed dataset $D_2$. This is performed iteratively through each iteration of i, until a trained model for each of the L perturbed samples is achieved. Each of the model, $y_i$, has the architecture same as the best fit model, $y_0$. This includes the predictor variables as inputs to the models and the number of hidden layers and hidden nodes.

At the end of L number of iterations of i, a number L of neural network models are collected. Often the sampling and model training for a single iteration of i are done back to back before moving on to the next iteration. This approach allows for usage of limited amount of storage for the datasets, as the perturbed datasets, $D_i$ can be discarded after training $y_i$, before moving on to the next iteration to generate $D_{i+1}$.

Point Prediction and Score Confidence

For the purpose of generating the point prediction, the best fit predictor model, $y_0$ is leveraged. Thus, the point prediction of the class associated with the datapoint being scored using the best fit predictor model, $y_0$, is generated. Accordingly, for a data point $d_l$ in D, the score from the best fit predictor model, $y_{0l}$, is obtained.

Once the set of density based neural network models, $y_i$, as described in the previous sections, is obtained, then all the data points $d_l$, in the original dataset, D, are scored using all the models, $y_i$. This provides a score distribution for each data point $d_l$ in D. Using the scores $y_{il}$, which includes $y_{0l}$, for the datapoint $d_l$, the standard deviation associated with the L+1 neural network model scores is computed. Along with that, the average of the scores, $\bar{y}_l$ is computed, which is also required for computing the standard deviation, $\sigma_l$. This entire process is conducted as part of the training process.

$$\sigma_{yl} = \sqrt{\frac{\sum_{i=0}^{L}(y_{il}-\bar{y}_l)^2}{L+1}} \quad (7A)$$

where, $$\bar{y}_l = \frac{\sum_{i=0}^{L} y_{il}}{L+1} \quad (7B)$$

The standard deviation, $\sigma_{yl}$, of the density based neural network scores, $y_{il}$, provides an easily comprehensible measure of confidence in the score. The term $\sigma_{yl}$ is called a score spread. The narrower the score spread, the higher the confidence in the point prediction of the model, $y_0$, and vice versa. Thus, as an example, $$\frac{1}{\sigma_{yl}}$$

is a good representation of confidence in the point prediction score, $y_{0l}$, based on the density witnessed in the corresponding grid during the training process. Accordingly, in some implementations, the score confidence, C, is defined as a statistical metric to represent the confidence in the score, as follows:

$$C_l = \frac{1}{\sigma_{yl}} \quad (8)$$

The confidence score $C_l$, reflects the confidence in the score, $y_{0l}$, for the datapoint, $d_l$. Similarly, distance of $y_{0l}$ from the mean value $\bar{y}_l$ represents another measure of confidence. This score distance is computed as absolute value of $(y_{0l} - \bar{y}_l)$. So, in another implementation of the metric to represent the score confidence, $C_l$, a combination of the score spread and the score distance can be used.

Confidence Model

Having a mechanism to produce the score confidence, C, in the production is important if one has to benefit from the density-based neural networks. Since many hundreds of perturbed datasets can be sampled, it leads to a large set of neural network models, which would be prohibitive to use in production to compute the confidence. This would be due to high computational overheads leading to larger memories to deploy the many models and more computational cycles to score. The density based neural network models for production usage are not retained, except for the best fit predictor model, $y_0$, which is used to generate the point estimate of the scores in the production. Since the original samples of neural network models are not stored, the score confidences must be generated. To do so, a model is leveraged that either memorizes the continuous outcome variable, C, the confidence score for each grid cell, or learns to predict it using a predictive model. This model that learns to generate the confidence score is called a confidence model.

In some implementations, the distributions seen during the model training phase are codified. To do so, a NoSQL lookup database is built that records density of scores spread across exemplars in the grid cells during the training phase. In the simplest version of this implementation, this NoSQL lookup database records the confidence scores associated with the data points in grid cells. The grid index is used to store and retrieve the confidence scores for a grid cell. This database is called Confidence Database.

In other implementations of a confidence score model, the confidence scores associated with the training dataset are learned during the training process. To do so, the original training dataset, D, is used to generate the density based scores, $y_{il}$, for each data point, $d_l$ in D, and compute the corresponding confidence score, $C_l$ using equations (7), (7.b) and (8). A linear regression model as well as a decision tree model can work well. A model is used to learn to predict the confidence score, $C_l$, using the predictor variables of the data points, $d_l$, and their point prediction scores, $y_{0l}$, as the input predictors. The generated confidence score, $C_l$, is used as the target to train the model. This model is called a Confidence Model.

To account for the regions in the phase space with no viable coverage, the grid is scanned through to determine each grid cell with less than M number of data points. These grid cells are stored in a NoSQL database using the grid index and is called a No-confidence Measure Database. Any grid cell stored in this database is a cell for which no score confidence measure can be assigned due to lack of coverage. If a data point being scored in production, falls in one of these grid cells with no viable coverage, it must be flagged as having no confidence measure. This is a signal to users of the model that although a score is produced there was insufficient coverage in the training data set and as such the score is suspect and is generalized relationships seen by informationally separate partitions of data. This database is required only while using a Confidence Model. If a Confidence Database is used instead, the no confidence measure is already recorded in that database. When discussing a combination of Confidence Model and a No-confidence Measure Database, the alternative use of Confidence Database is implied.

For a datapoint that belongs to a grid cell with no viable coverage, in one implementation, the best fit neural network generates the point prediction score and then it is marked as having no confidence measure. In another implementation, the best fit neural network does not generate a score if the datapoint falls in a grid cell of no viable coverage.

Scoring System of Density Based Neural Network

Figure 4:
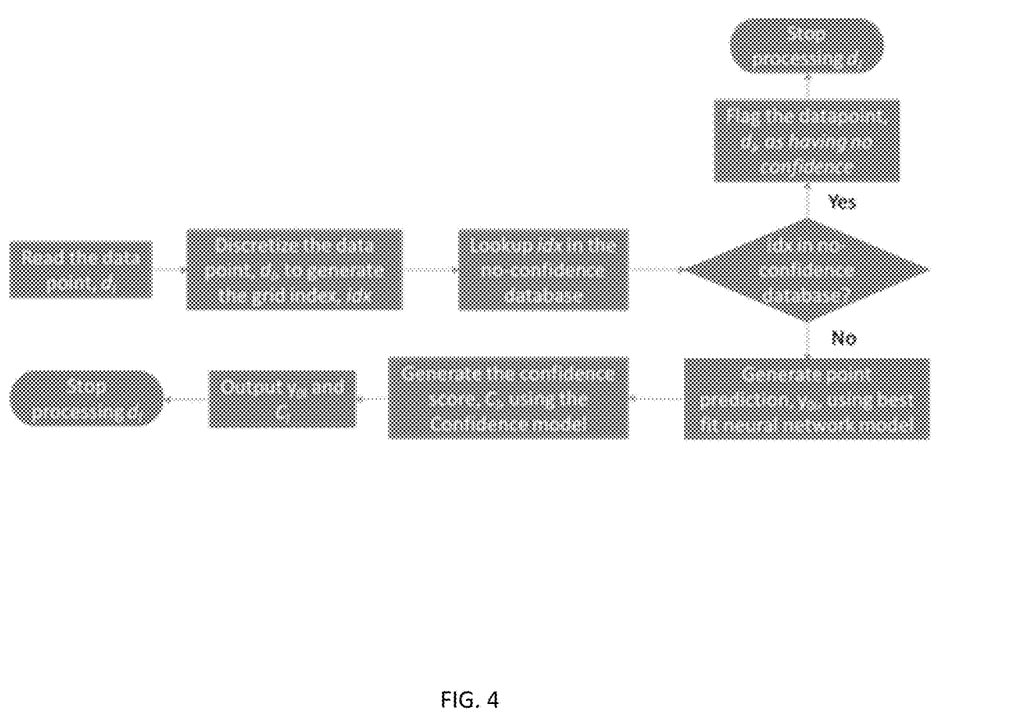
FIG. 4 is a schematic process flow diagram of a particular implementation of a system for density based neural network.

Thus the scoring system comprising of density based neural network operates with two models, the point prediction model, $y_0$, that generates the score, and the confidence model, C, that provides an estimate of the confidence in the score. Apart from these, a no-confidence measure database is also implemented as a NoSQL database. Alternatively, a Confidence Database is used in lieu of the combination of Confidence Model and the No-confidence measure database At the time of scoring, the data point is discretized to identify the grid cell it falls into, and the corresponding grid index is then looked up in the No-confidence Database. If it exists in this table, the score is flagged as having no confidence measure; else the best fit model is used to generate the point prediction, and the confidence model is used to generate the confidence score. In some implementations a look up of confidence for the grid can be utilized. The point prediction along with the confidence score is then presented as a combined output of the density based neural network model. FIG. 4 shows the process flow of such a system. In an alternative implementation, the neural network generates the score even if the datapoint belongs to a grid cell with no viable coverage, though in such a case the score is still flagged as having no confidence measure.

FIG. 4 is a schematic process flow of a particular implementation of a system for density based neural network. The scoring system consists of point prediction model that generates the score, and the confidence model that generates the confidence score along with the No-confidence database. In an alternative implementation, the neural network model generates the score even if the datapoint belongs to a grid cell with no viable coverage, though in such a case the score is still flagged as having no confidence.

Figure 5:
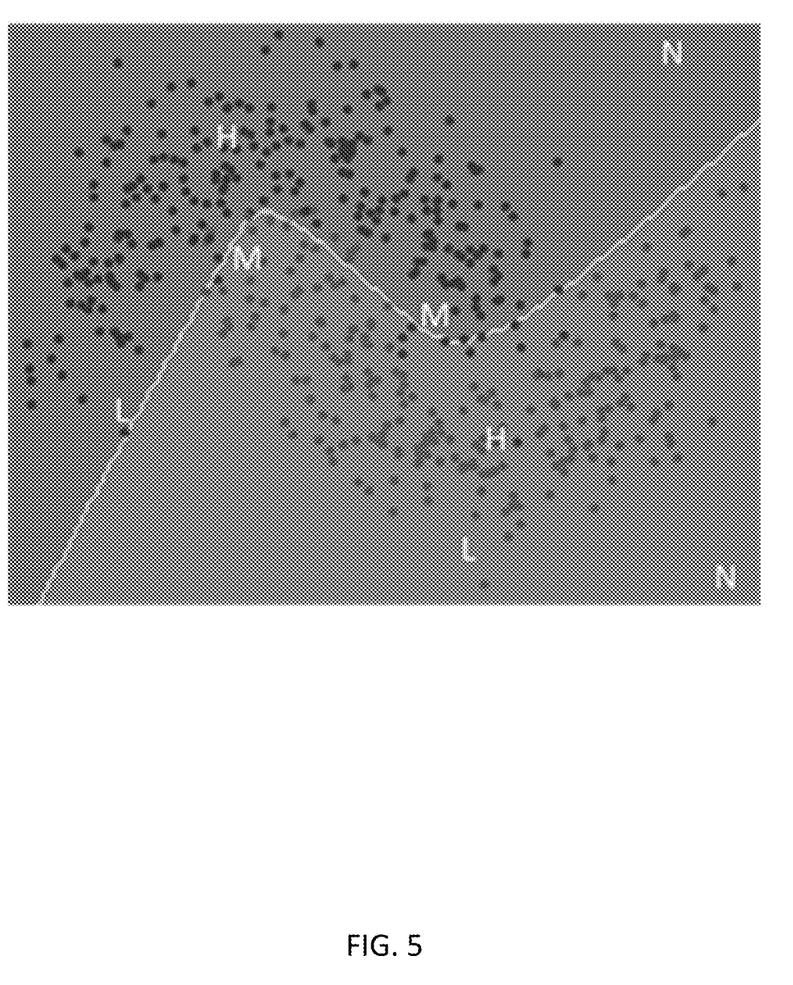
FIG. 5 illustrates a classification boundary learnt by a model trained on a particular data type.

Consider the example of classification problem on "moon data". The scores have lower confidence in the regions where there are lesser number of exemplars, as shown in FIG. 5. Also the confidence scores are not very high along the decision boundary even in the regions with strong coverage. Most importantly, due to no coverage in certain regions, the scoring system flags them as having no confidence.

FIG. 5 illustrates a classification boundary for a model trained on "moon data", that is shown as yellow boundary. Two regions of high confidence have been marked with H, two regions of medium confidence have been marked with M, two regions of low confidence have been marked with L, and two regions of no confidence have been marked with N in this schematic representation of score confidence.

Application in Fraud Management

Figure 6A:
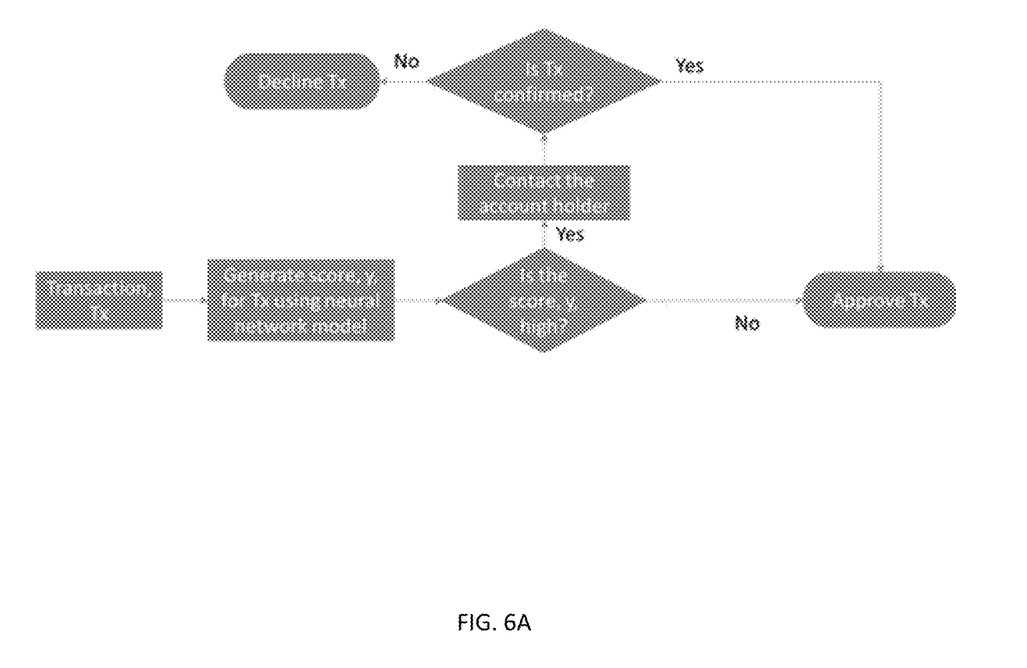
FIG. 6A illustrates a schematic process flow for decisioning on a traditional decision model's output for a fraud case management use-case.

Neural network models have been successfully used for almost three decades to identify third party fraudulent financial transactions, say unauthorized usage of a credit card. High scoring cases indicating potential fraud are then put in a case management system for adjudication. The account holder is then contacted to confirm whether they had initiated the said transaction. This contact could be via a myriad of ways, including a phone call, or an app based authentication for example. Based on this verification, the transaction is either allowed to go through or terminated. FIG. 6A shows this process in a schematic manner.

FIG. 6A shows a schematic process flow for decisioning on a traditional decision model's output. The decision model in question, a neural network model, is used to process and score all credit card transactions, in this schematic example. When a transaction receives a high score, it is put in a case management system, and the account holder is contacted to verify the authenticity of the transaction. Based on the confirmation the transaction is either approved or declined.

As has been described earlier, traditional decision models, including neural network models, can come off as too confident, made tricky in that the score in systems such as FIG. 6A assume the same 'rightness' and same implied confidence in the score. Systems such as case management have assumed 'higher scores' are more confident and would send the highest scores to automated decisioning such as approve/decline but such a direct correlation is not correct. As such, only small volumes of the highest scoring cases are automated, and there is a more expensive manual intervention through human analysts reviewing model results with suspect customers and/or fall through where automated resolution causes customers to call in. This is wasteful of time, costly and creates unnecessary friction in user experience where model scores are not uniformly confident. Using the density based neural networks though it is possible to address these aspects.

Figure 6B:
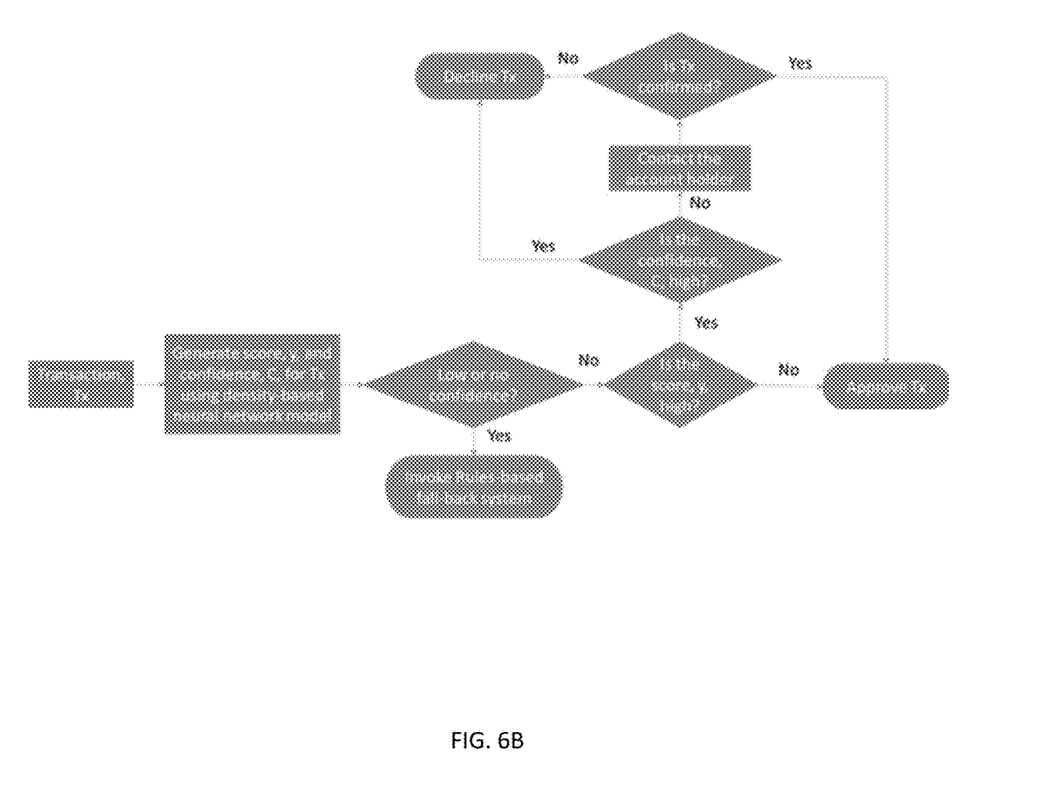
FIG. 6B illustrates a schematic process flow for decisioning using a density based decision model's output for a fraud case management use-case.

By using both the model score and the confidence the system in FIG. 6A can be revised to work cases and in fact even generate them based on score when there is high confidence. Thus, when the score of a model is determined to be of high confidence as determined by the confidence model as part of the density based neural network, the transaction can be automatically adjudicated and terminated. In such a case, only the high scoring cases that are deemed to be of insufficient confidence would have to be put in the case management system for manual intervention and adjudication where more care is necessary. Where there is no confidence the transaction would be passed to a fallback rules system on the diagram for additional rules scoring. This saves times, reduces costs, and addresses unnecessary friction in user experience. FIG. 6B describes this process in a schematic fashion for one illustrative use case. Contrast the FIGS. 6A and 6B.

FIG. 6B shows a schematic process flow for decisioning using a density based decision model's output. The decision model in question, a density based neural network model, is used to process and score all credit card transactions, in this schematic example. When a transaction receives a high score, its confidence score is analyzed to determine whether to automatically block and decline the transaction, or in case of low confidence, put it in a case management system. Where there is no confidence the transaction would be scored by a rules-based system that serves as a fall-back system where the neural network should not be used. This reduces the need for contacting the account holder for transactions that score high, i.e., likely fraud, with very high confidence and also avoids situations where high scores are worked that are actually of low or no-confidence and a different approach is needed.

Application in Dealing with Adversarial Attacks

Adversarial attacks try to leverage the uncertainty in the phase space of interest where minor perturbations can lead to dramatically different model score estimates. These expert machine learning criminals know that models have weaknesses and purposely manipulate their activities to bring the model's variables into a state of lower fraud scores so they go undetected. Traditionally built models, which do not have a sense of the confidence in their scores, can be exploited to generate scores desired by an adversary by minor modifications in the input datapoints in uncertain regions. But with density based models, such exploit becomes difficult, as the model generates a confidence score along with a point estimate of the score.

Figure 7:
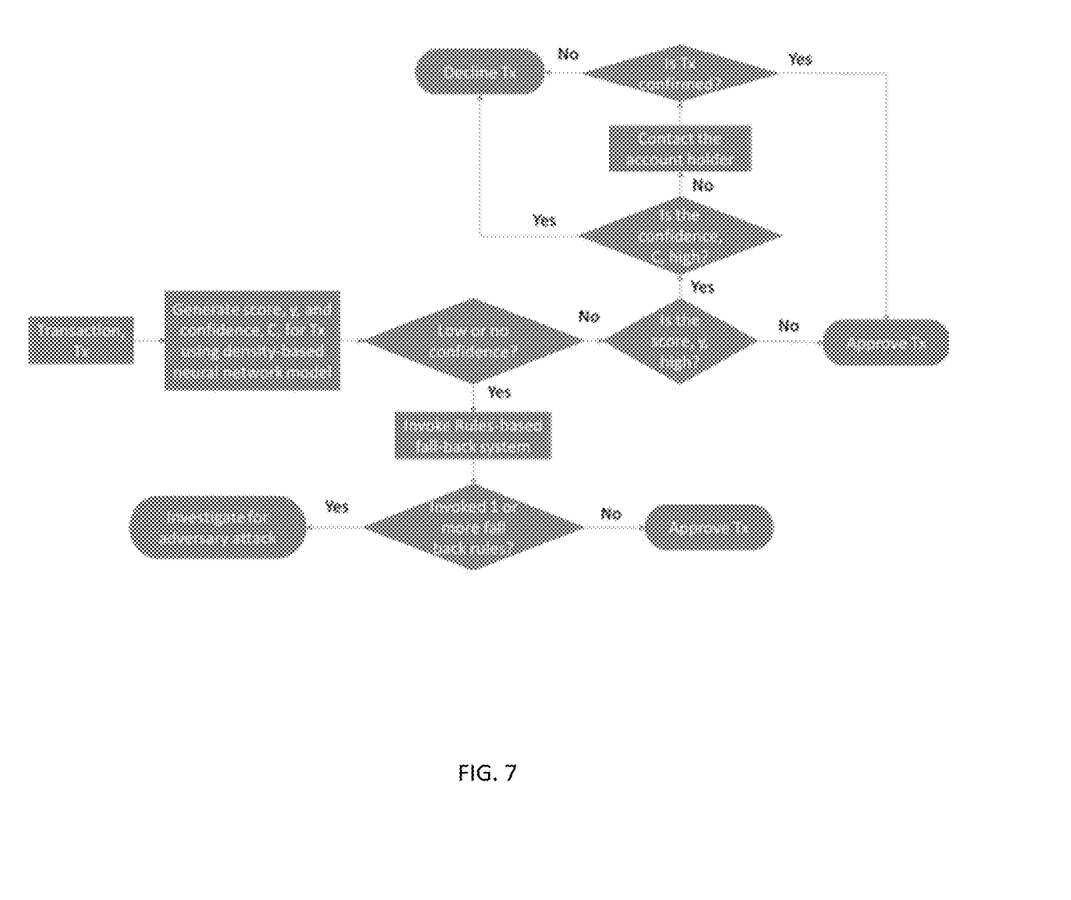
FIG. 7 illustrates a schematic process flow for decisioning using a density based decision model's output designed to deal with adversarial attacks crafted by criminals to take advantage of uncertainty in scores.

FIG. 7 shows a system where the model score when of low to no-confidence causes the neural network score to not be considered, but instead the transaction goes through a fall-back rule set. This fall-back rule set applies to both high and low scoring transactions where expert machine learning criminals will artificially lower scores on their suspect activity. The fraud model producing a low fraud score with low score confidence, would trigger further triaging. Thus, models that have built-in understanding of confidence in their predictions are less amenable to adversarial attacks. Although the fraction of transactions that will go to the fall-back rules will be small or even tiny, these low- to no-confidence scores can be responsible for a large majority of fraud loss particularly in automated fraud attacks on the financial institution.

FIG. 7 shows a schematic process flow for decisioning using a density based decision model's output designed to deal with adversarial attacks crafted by criminals to take advantage of uncertainty in scores. Using a density-based neural network model, the transaction can be directed to a triaging system when there is low or no confidence generated by the density-based neural network. Such a triaging system can then assess using set of rules and case management, whether the transaction is genuine or not, and even investigate for adversary attack. Usually only a tiny fraction of transactions go through the triaging system.

As described herein, a system and method for training a density-based neural network scoring system is disclosed. The method provides a point predication, in the same way as traditional neural network models do. More significantly, it also provides a confidence score, or flags the data point has belonging to a region in the variable phase space with no coverage and hence no confidence. Ability to assign confidence score allows application of predictive models in previously untouched areas, for example, when the training dataset, D, has few exemplars, or when there are not enough coverage available in a particular region in the data phase space, or even when some of the target variables are corrupted (i.e., confidence in the target is lacking).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for generating a confidence score of a neural network predictive model, the method comprising:
    selecting an original neural network model from a set of neural network models for an original dataset, the original neural network model having a set of predictor variables, a given dataset comprising a plurality of datapoints that are mapped into a high-dimensional grid that defines a plurality of neighborhood data regions, each of the neighborhood data regions having a density of datapoints;
    applying the original neural network model on the original dataset to generate a model score for each datapoint in the given dataset, the model score representing a fit of input predictor variables to target variable for the set of variables of the original neural network model;
    iteratively perturbing the given dataset by sampling neighborhood data regions to duplicate, eliminate or retain each datapoint therein according to a density-based perturbation logic to generate a plurality of perturbed training datasets;
    generating a perturbed neural network model based on each generated perturbed training dataset, to train a plurality of perturbed neural network models;
    applying each perturbed neural network on the original dataset to generate a model score for each datapoint in the given dataset, to generate a plurality of model scores for each data point in the original dataset;
    computing a statistical variation of the scores of each datapoint in the original dataset generated by the plurality of perturbed neural networks to train a confidence model with the statistical variation as the target;
    creating a no-confidence measure database that records the neighborhood data regions with a data population density below a coverage threshold on the original training data within each neighborhood data region;
    generating, using the confidence model, a confidence score for each datapoint in a second dataset, the confidence score defining a confidence of the original neural network model score for each datapoint in the second dataset; and
    flagging a datapoint in the second dataset as having no confidence, if the corresponding grid cell is present in the no-confidence measure database.

2. The method in accordance with claim 1, wherein the selecting is based on a hyper-parameter search executed by training a set of neural network models.

3. The method in accordance with claim 1, wherein selecting the original neural network model is based on the original neural network model being a best fit for the original dataset.

4. The method in accordance with claim 1, wherein the high-dimensional grid is generated by discretizing the predictor variables of the original neural network using a grid generation methodology.

5. The method in accordance with claim 1, wherein the sampling of neighborhood data regions further includes selecting neighborhood data regions having an associated density defined by the original dataset that exceeds a threshold.

6. The method in accordance with claim 1, wherein the sampling of neighborhood data regions is based in part on an overall count of each class of the datapoints in the original dataset in an associated neighborhood data region.

7. The method in accordance with claim 1, wherein generating the confidence score further includes discretizing each datapoint in the second dataset using the grid of plurality of neighborhood data regions defined on the original dataset and applying the confidence model to generate a confidence measurement for each datapoint in the second dataset.

8. The method in accordance with claim 1, wherein generating the confidence score further includes discretizing each data point in the second dataset by the grid generation methodology of plurality of neighborhood data regions defined on the original dataset and looking up a grid reference in the no-confidence measure database based on the original dataset.

9. The method in accordance with claim 1, further comprising of replacing the confidence model and the no-confidence measure database with a confidence lookup database that records statistics of the confidence scores of each neighborhood data region of the grid of plurality of neighborhood data regions defined on the original dataset in the original dataset generated by the plurality of perturbed neural networks.

10. A system comprising:
a programmable processor; and
a non-transitory, machine-readable medium storing instructions that, when executed by the processor, cause the at least one programmable processor to perform operations comprising:
selecting an original neural network model from a set of neural network models for an original dataset, the original neural network model having a set of predictor variables, a given dataset comprising a plurality of datapoints that are mapped into a high-dimensional grid that defines a plurality of neighborhood data regions, each of the neighborhood data regions having a density of datapoints;
applying the original neural network model on the original dataset to generate a model score for each datapoint in the given dataset, the model score representing a fit of input predictor variables to target variables for the set of variables of the original neural network model;
iteratively perturbing the original dataset by sampling neighborhood data regions to duplicate, eliminate or retain each datapoint therein according to a density-based perturbation logic to generate a plurality of perturbed training datasets;
generating a perturbed neural network model based on each generated perturbed training dataset to train a plurality of perturbed neural network models;
executing each perturbed neural network on the original dataset to generate a model score for each datapoint in the original dataset, to generate a plurality of model scores for each data point in the original dataset;
computing a statistical variation of the scores of each datapoint in the original dataset generated by the plurality of perturbed neural networks to train a confidence model, with the statistical variation as the target;
creating a no-confidence measure database that records the neighborhood data regions with a data population density below a coverage threshold on the original training data within each neighborhood data region;
generating, using the confidence model, a confidence score for each datapoint in a second dataset, the confidence score defining a confidence of the original neural network model score for each datapoint in the second dataset; and
flagging a datapoint in the second dataset as having no confidence if the corresponding grid cell is present in the no-confidence measure database.

11. The system in accordance with claim 10, wherein the selecting is based on a hyper-parameter search executed by training a set of neural network models.

12. The system in accordance with claim 10, wherein selecting the original neural network model is based on the original neural network model being a best fit for the original dataset.

13. The system in accordance with claim 10, wherein the high-dimensional grid is generated by discretizing the predictor variables of the original neural network using a grid generation methodology.

14. The system in accordance with claim 10, wherein the sampling of neighborhood data regions further includes selecting neighborhood data regions having an associated density defined by the original dataset that exceeds a threshold.

15. The system in accordance with claim 10, wherein the sampling of neighborhood data regions is based in part on an overall count of each class of the datapoints in the original dataset in an associated neighborhood data region.

16. The system in accordance with claim 10, wherein generating the confidence score further includes discretizing each datapoint in the second dataset using the grid of plurality of neighborhood data regions defined on the original dataset and applying the confidence model to generate a confidence measurement for each datapoint in the second dataset.

17. The system in accordance with claim 10, wherein generating the confidence score further includes discretizing each data point in the second dataset by the grid generation methodology of plurality of neighborhood data regions defined on the original dataset and looking up a grid reference in the no-confidence measure database based on the original dataset.

18. The system in accordance with claim 10, further comprising replacing the confidence model and the no-confidence measure database with a confidence lookup database that records statistics of the confidence scores of each neighborhood data region of the grid in the original dataset generated by the plurality of perturbed neural networks.

19. A computer program product comprising a non-transitory machine-readable medium storing instructions that, when executed by at least one programmable processor, cause the at least one programmable processor to perform operations comprising:
selecting a first neural network model from a set of neural network models for a first dataset, the first neural network model having a set of predictor variables, a second dataset comprising a plurality of datapoints that are mapped into a high-dimensional grid that defines a plurality of neighborhood data regions, at least one of the neighborhood data regions having a density of datapoints;
applying the first neural network model on the first dataset to generate a model score for one or more datapoints in the second dataset, the model score representing a fit of input predictor variables to target variable for the set of variables of the first neural network model;
iteratively perturbing the second dataset by sampling neighborhood data regions to duplicate, eliminate or retain at least one datapoint therein according to a density-based perturbation logic to generate a plurality of perturbed training datasets;

generating a perturbed neural network model based on at least one generated perturbed training dataset, to train a plurality of perturbed neural network models;

applying at least one perturbed neural network on the first dataset to generate a model score for one or more datapoints in the second dataset, to generate a plurality of model scores for each data point in the original dataset;

computing a statistical variation of the scores of at least one datapoint in the first dataset generated by the plurality of perturbed neural networks to train a confidence model with the statistical variation as the target;

creating a no-confidence measure database that records the neighborhood data regions with a data population density below a coverage threshold on the original training data within each neighborhood data region;

generating, using the confidence model, a confidence score for at least one datapoint in the second dataset, the confidence score defining a confidence of the first neural network model score for one or more datapoints in the second dataset; and flagging a datapoint in the second dataset as having no confidence, if the corresponding grid cell is present in the no-confidence measure database.

20. The computer program product in accordance with claim 19, wherein the selecting is based on a hyper-parameter search executed by training a set of neural network models, the sampling of neighborhood data regions further including selecting neighborhood data regions having an associated density defined by the first dataset that exceeds a threshold, and the sampling of neighborhood data regions being based in part on an overall count of a class of the datapoints in the first dataset in an associated neighborhood data region.

* * * * *